Feb. 13, 1940. B. CLAYTON 2,190,592
PROCESS OF AND APPARATUS FOR PRODUCING SOAP
OF DESIRED MOISTURE CONTENT
Filed Dec. 4, 1937 3 Sheets-Sheet 3

Fig.3.

INVENTOR
BENJAMIN CLAYTON
BY HARRIS, KIECH, FOSTER & HARRIS

ATTORNEYS.

Patented Feb. 13, 1940

2,190,592

UNITED STATES PATENT OFFICE 2,190,592

PROCESS OF AND APPARATUS FOR PRODUCING SOAP OF DESIRED MOISTURE CONTENT

Benjamin Clayton, Houston, Tex.

Application December 4, 1937, Serial No. 178,168

15 Claims. (Cl. 87—16)

This invention relates to a novel method and apparatus for producing a soap of desired moisture content and is advantageous in various other respects.

The invention can effectively be used on soap produced from a saponification of various saponifiable materials but is not limited to any particular mode of saponification and can receive soap made by well known processes. If this soap contains glycerine or water, these materials can be separated by vaporization in certain preliminary steps. On the other hand, the process can well start with substantially anhydrous soap, however produced.

In forming soap, it is customary to apply heat to a mixture of saponifiable and saponifying materials. Within the meaning of the present invention, the saponifiable material may be any of the fats, oils, greases, fatty acids, etc., which are commonly used in soap manufacture, including tallow and other animal fats, cottonseed oil, various other vegetable oils and fats, fish oils, fatty acids from various sources, materials containing saponifiable acids (e. g., rosin or other resinous substances), etc. The saponifying material may include any of those substances which are adapted to produce saponification of such materials. Alkaline substances are commonly used, usually, though not invariably, in aqueous solution. If saponifiable materials of the glyceride type are used, the resulting products will contain glycerine. On the other hand, saponification of fatty acids can produce a soap which is substantially glycerine-free. The reaction products usually, though not necessarily, contain water and the present process can well start with soap from which the water or glycerine, or both, have been removed, or it can start with the reaction products obtained from various saponifying processes and act, through preliminary steps, to remove the glycerine or water, or both. On the other hand, the process will be described with reference to a saponifying system receiving the saponifiable and saponifying materials, though it will be clear that the invention is not limited to this saponification system, though it is well adapted to the receipt of products from a continuous saponification step and has many advantages when used in this connection.

According to the present invention, a substantially anhydrous soap, however produced, is excessively hydrated by adding moisture in amount greater than that desired in the finished soap, the excess moisture being then removed to produce a soap of the desired moisture content. It is an important object of the present invention to provide a novel method and apparatus for accomplishing this result.

It is a further object to remove such substantially anhydrous soap from a zone containing same and add the excessive amount of moisture in a subsequent hydrating zone, preferably confined from the atmosphere, and to treat the excessively hydrated soap in such manner as to vaporize the excess moisture to produce a soap of desired moisture content.

Another object of the invention is to continuously supply such soap to a hydrating zone, there add the excess amount of water and continuously remove the excessively hydrated soap preparatory to vaporization of the excess moisture. Within the present invention, such hydration can be effected during continuous movement of the soap, as by hydrating a continuously moving stream of substantially anhydrous soap or hydrating during circulation of or in a mass of soap which may contain moisture.

Prior to, during, or after such hydration, it is often desirable to cool the soap to some extent before removal of the excess water and it is an object of the present invention to provide a novel method and apparatus for accomplishing this end.

One important application of the invention is in the processing of a substantially anhydrous soap which is fluid due to the presence of heat, with the end in view of producing a soap of desired moisture content. Such fluid soap must exist in a zone confined from the atmosphere, for oxidation or discoloration or other deleterious reactions would result if it were exposed to the air at the high temperature necessary to maintain it in this condition. If water is introduced into such a fluid soap, it will be vaporized if the existing pressure is such that the temperature of the soap can cause formation of steam. Similarly, if such soap is introduced into a soap mass containing water, some of this water will vaporize under appropriate pressure conditions.

It is an object of the present invention to excessively hydrate anhydrous soap which is fluid due to the application of heat and then remove the excess moisture, for example, by vaporization.

It is a further object of the invention to move a soap stream continuously into a soap mass and to so control conditions of heat and pressure that the soap will be excessively hydrated at this stage of the process before the excess moisture is removed. Such a soap stream need not be composed exclusively of soap. In some instances, other materials may be present, for instance, water, glycerine, etc. Nor need the soap mass be composed exclusively of soap for this term also includes a mass of soap containing water and, in some instances, other materials such as perfumes, builders, filler, etc., commonly used in soap manufacturing.

However, very desirable results accrue from a process in which the soap stream is formed of soap which is fluid due to the presence of heat and which is substantially anhydrous. Such a soap stream often contains little, if any, glycerine. Introduction of such a soap stream into a soap mass which contains water will effectively hydrate the soap to the excessive degree herein-contemplated, particularly if conditions of heat and pressure are properly controlled. At the same time, if water is permitted to vaporize from such a soap mass, the incoming soap stream will be cooled, as controlled by the rate of vaporization. It is an important object of the present invention to properly correlate conditions in a chamber containing such a soap mass to effect the excessive hydration before removal of some of the moisture to produce a finished soap of desired moisture content.

It is another object of the invention to maintain in such a hydrating zone a soap mass and to introduce sufficient moisture to supply the water necessary for the excessive hydration and also to compensate for steam which may be removed from the upper end of this hydrating zone.

Another object of the invention is to provide a novel method and apparatus for advancing the soap from one portion of the equipment to another.

Still a further object of the invention is to process a substantially anhydrous soap to produce soap particles which may be in the form of powder or granules of solid, cellular or hollow masses.

Further objects and advantages of the invention will be made evident hereinafter.

Referring to the drawings.

Figure 1:
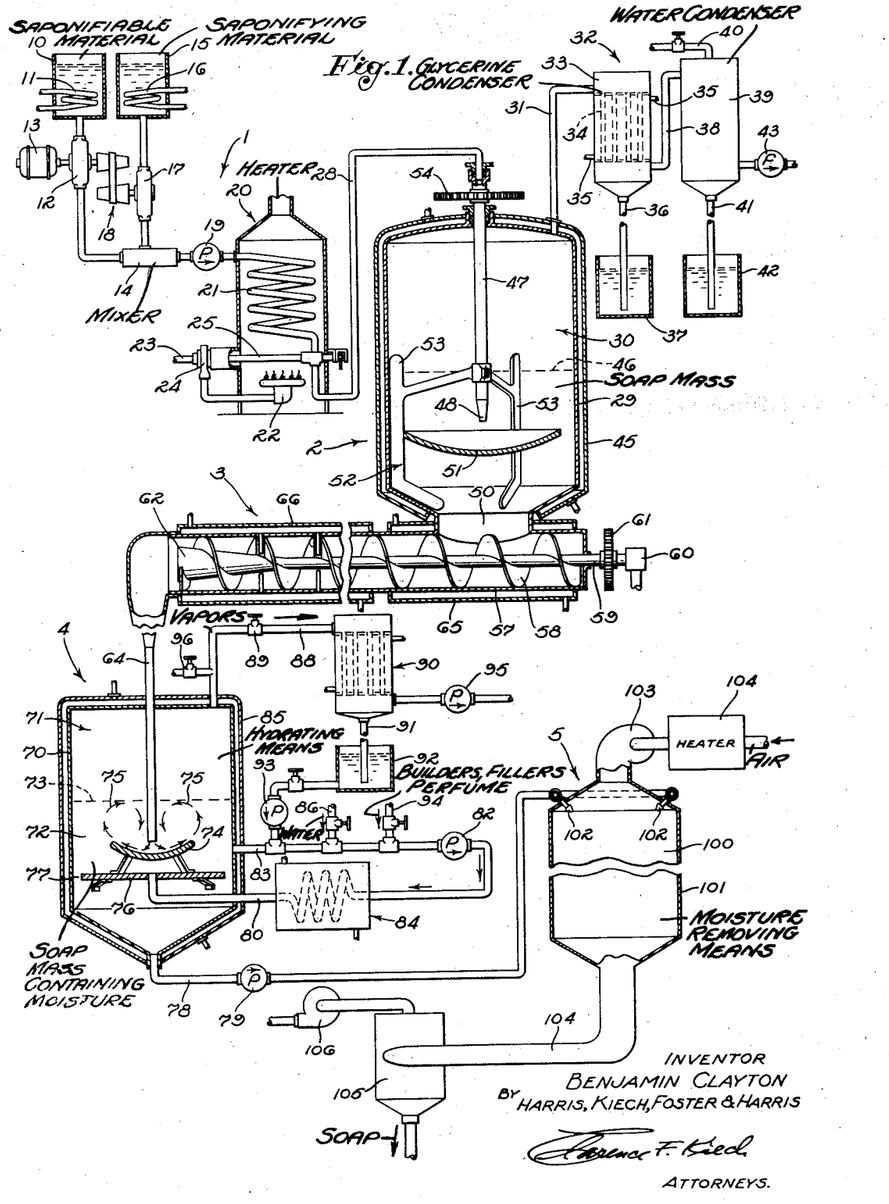
Figures 1, 2, and 3 diagrammatically show alternative systems, partially in section, which can be used to perform the method.
Figure 2:
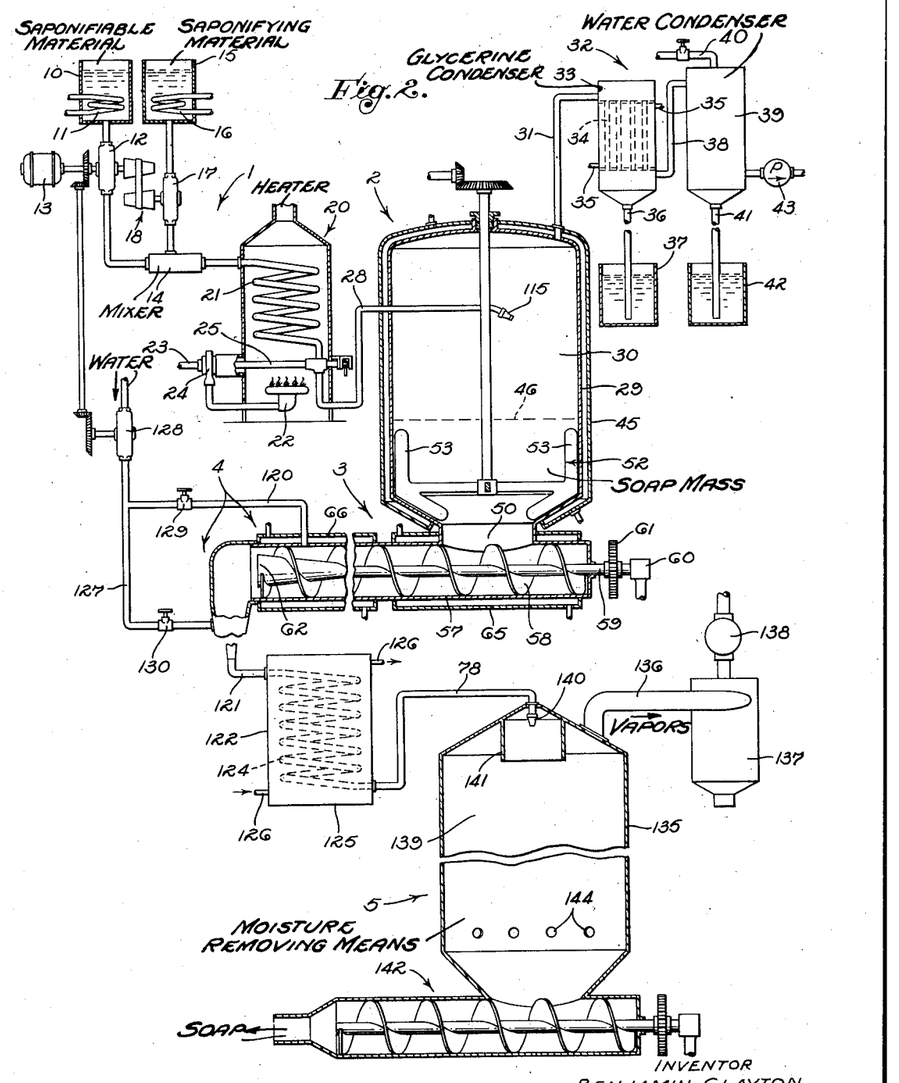
Figure 3:
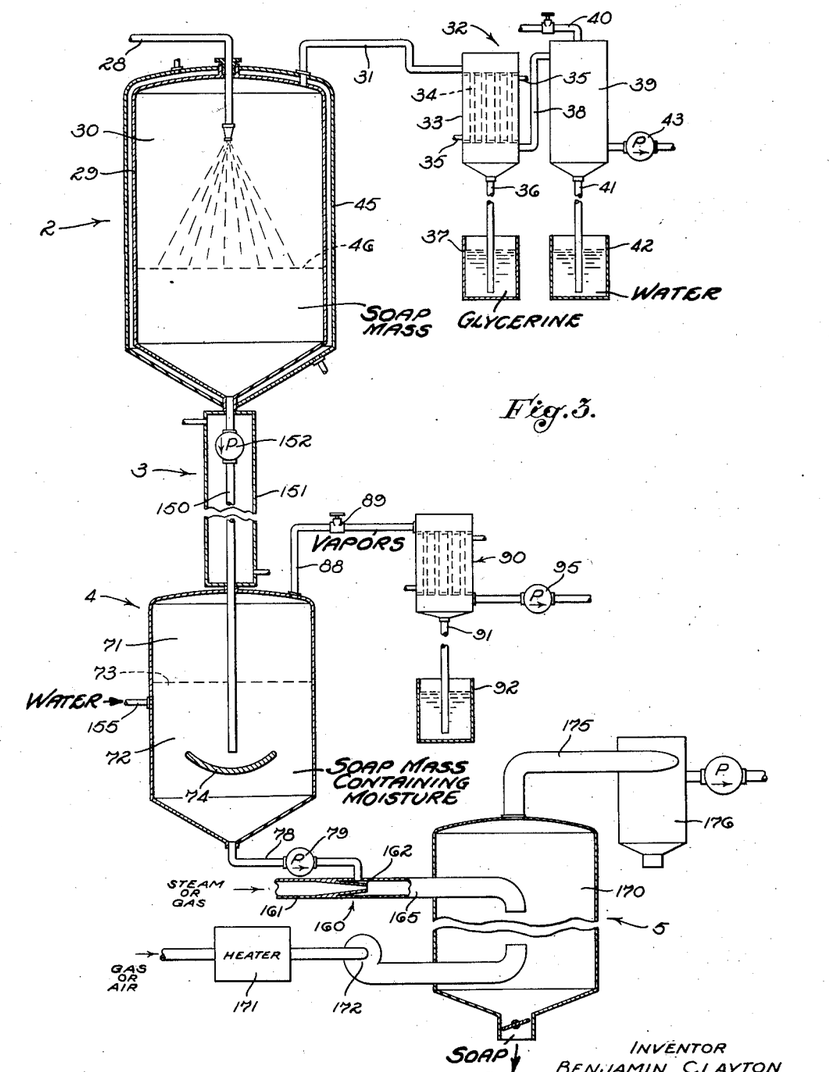

In each of the forms of the invention disclosed in Figures 1 to 3, certain general elements are shown. Thus, the numeral 1 represents a saponifying means, 2 represents a means for collecting anhydrous soap, 3 is a transport means for moving the anhydrous soap to a hydrating means 4, and 5 is a moisture-removing means. The various figures show different embodiments of these general elements, though it should be clear that one or several of these elements shown in any particular embodiment can usually be substituted for corresponding elements in other embodiments.

Referring particularly to Figure 1, the saponification means 1 is shown as being of the continuous type for the invention is well adapted thereto. However, other saponifying means of the batch or continuous type may be used in this connection. As disclosed, the saponifiable material in a tank 10 can be heated to a desired extent by a heater 11. A pump 12, driven by variable-speed motor 13, withdraws a stream of the material and delivers it to a mixer 14. The saponifying material may be retained in a tank 15 heated, if desired, by a heater 16 and a proportioned stream is withdrawn by pump 17 and delivered to the mixer 14. The pumps 12 and 17 may be connected by any suitable variable-speed connection 18 to control the proportions of the two materials. The mixer 14 may be of any suitable type which will intimately mix these materials. Injection of the saponifying material 5 into a stream of the saponifiable material will give satisfactory results with or without an auxiliary mixing action.

A pump 19 withdraws the mixture from the mixer 14 and delivers it to a heater 20. This pump may serve the function of additionally mixing the materials and increasing the pressure thereon sufficiently to move the stream into the means 2. It will also relieve the proportioning pumps 12 and 17 of high pressure which might otherwise be required.

Saponification begins when the mixture is formed but is completed in the heater 20. Flow through an elongated passage, such as is provided by a coil 21, is desirable. Heat may be supplied by a burner 22 receiving fuel through pipe 23, as controlled by a valve 24. This valve is in turn controlled by a thermostatic element 25 which may well be of the type shown in the patent to Kerrick, No. 1,968,525. In such a thermostatic means, the reaction products flow inside a tube which is cooled internally by the flowing reaction products and heated externally by the products of combustion from the burner 22. Flow through this coil completes saponification. The pressure progressively decreases during this flow and the temperature progressively increases, both factors contributing to vapor formation. If a saponifiable material of the glycerine type is used in conjunction with an aqueous saponifying solution, the reaction products will contain soap, water and glycerine. If glycerine is to be removed substantially completely from the soap, it is usually desirable that all of the water and at least a part of the glycerine should be in vapor state in pipe 28 into which the coil 21 discharges. On the other hand, if most or all of the glycerine is to be retained in the soap, it is not necessary to vaporize much or any of the glycerine in the coil 21, and even a portion of the water may be in liquid state in the pipe 28.

A heater, such as indicated by the numeral 20, can well be used ahead of the means 2, even if batch saponification is employed. For instance, it can receive a stream containing soap, water and glycerine, or soap and water with little or no glycerine, and can heat this stream to such an extent that, when introduced into the means 2, vaporizable material or materials will separate and accumulate a substantially anhydrous soap.

The function of the means 2 is to collect the substantially anhydrous soap temporarily. Desirably, it can also be used to separate vapors from the soap. It provides a container 29 defining a zone 30 from which air is preferably excluded. Vapors separating from the soap in this zone may be withdrawn through pipe 31 and condensed, if desired, in a condenser system 32. As shown, these vapors first pass through a glycerine condenser 33, being therein indirectly cooled by a cooling medium flowing around pipes 34 through connections 35. The condensate may move through a barometric column 36 and discharge into a receiver 37, the column being of sufficient height to compensate for any reduced pressure in the zone 30. Remaining vapors move through a pipe 38 and are condensed in a water condenser 39 which may be of the jet type to receive water through pipe 40. The condensate drops through a barometric column 41 to a receiver 42. Any uncondensed products may be removed through a vacuum pump 43 which may also be used to maintain a high vacuum in the zone 30.

The soap collects in the lower end of the zone 30 and its condition will depend in part upon the nature of the soap being processed and the temperature and pressure in the zone 30 and in the incoming stream. If sufficient heat is applied during flow through the coil 21 and a high vacuum is maintained in the zone 30, substantially all of the volatiles, particularly water and glycerine, will vaporize and a mass of soap will collect in the zone 30 which is fluid due to the presence of heat. By this term, I have reference to soap which is either quite fluid and in a molten condition, or soap which is somewhat less fluid, for example in a plastic condition. The term is used as counterdistinguishing from a sub-divided soap, e. g., soap in powdered or granular condition which will collect in this chamber if less heat is applied in the coil 21 or if higher absolute pressures are maintained in the zone 30. Under such conditions as will deposit powdered soap in this chamber, it is still possible to produce a substantially anhydrous soap, though it is difficult to remove substantially all of the glycerine therefrom. However, some of the glycerine can be removed and the amount will increase with heat applied to the zone 30, as by circulation of a heating medium through a jacket 45, or introduction of steam, preferably superheated, into this zone.

While the invention is not limited to the condition of the substantially anhydrous soap which collects in and is withdrawn from the zone 30, and while the subsequent excessive hydration can be effected with either sub-divided soap or soap which is fluid due to the presence of heat, I have a decided preference for a mode of operation involving collection and withdrawal of the fluid soap. Separation of glycerine and water vapors is facilitated and the hydration can be easily accomplished by any of the expedients hereinafter disclosed. Practically all of the glycerine can be removed in vapor form and condensed into a valuable and quite pure product, and this can be done either by fractional condensation or by condensation of glycerine and water vapors together, followed by subsequent separation of the condensate. Further, if this fluid soap is collected, there is a cleaner separation of soap and vapors, with little or no soap being carried over with the vapors.

Regardless of whether the soap mass which collects in the zone 30 is in a fluid condition due to the presence of heat, or in a sub-divided condition, it is often desirable to maintain the upper surface of the soap mass above the point of discharge of the incoming stream. In Figure 1, this upper surface is indicated at 46 and the stream is discharged from the pipe 28 into a rotatable pipe 47 providing a lower end which may be open or restricted as desired, indicated by the numeral 48. The depth of submergence is such that the incoming stream will be discharged beneath the surface 46 as distinct from merely making an indentation therein.

Such submerged introduction has numerous advantages. The vapors separate from the soap mass as distinct from separating in an expanding jet of the products if introduced into the upper end of the zone 30. Such submerged introduction avoids turbulence in the vapor space in the upper end of the zone 30 and avoids the carrying of soap upward with the vapor. In addition, it sets up a circulation in the soap mass in the zone 30 which renews the upper surface and gives more uniform heat transfer. Of major importance is the fact that such submerged introduction facilitates vapor separation due to the factors above-mentioned. However, it should be clear that the incoming stream may be introduced into the zone 30 in other ways, for example, by use of the expedients shown in Figures 2 and 3.

To prevent the incoming stream from moving directly to a discharge passage 50, a deflector 51 may be interposed to confine the circulation mainly to that portion of the soap mass thereabove. It is also desirable to provide a scraper or agitator, indicated in general by the numeral 52, including members 53 which rotate adjacent or in contact with the inner wall of the container 29 to insure delivery of the soap to the discharge passage 50. If desired, the pipe 47, the deflector 51 and the scraper or agitator 52 may be integrally mounted and slowly turned by means of a gear 54.

The apparatus thus far described represents one way of producing the anhydrous soap which is to be subsequently processed. This soap can be made by various other means and may contain some or substantially no glycerine. The term "substantially anhydrous" does not exclude traces of moisture which may be left in the soap in commercial practice. In some instances, the substantially anhydrous soap may be actually formed in the means 2.

Referring to the transport means 3, the function thereof is to transport the substantially anhydrous soap from the zone 30 to the hydration means 4, preferably in the form of a continuously moving soap stream. In addition, it may desirably function to increase the absolute pressure of the soap so that a higher pressure can be maintained in the hydrating means, if desired. Likewise, it may well serve as a vacuum seal for the zone 30 to withdraw the soap without materially impairing the vacuum therein. It may also cool or heat the soap or merely maintain its temperature and, in Figure 2, it may serve in a hydrating capacity.

The type of transport means utilized will depend upon the character of the soap to be conveyed, to wit, whether fluid or subdivided. A pump can sometimes be used, though a screw conveyor is best adapted for advancement of either type of soap. Such a screw conveyor may be of sufficient length to perform the desired functions and may consist of a single screw or a plurality of intersecting screw conveyors through which the soap is progressively moved. As shown, this transport means includes a housing 57 communicating with the withdrawal passage 50 and containing a screw 58 providing a shaft 59. The vanes of this screw may engage the housing 57 to journal the unit and a thrust bearing 60 may also be provided. Suitable means, such as a gear 61, is used to rotate the screw in a direction to move the soap leftward in Figure 1. If desired, that portion of the shaft 59 at the terminal end of the screw may be enlarged to form a head 62 and cooperate with the housing in providing a tapered and restricted passage. The screw may feed the soap directly into the hydrating means 4 or indirectly thereinto through pipe 64. Heating or cooling of the soap during advancement in the housing 57 may be effected by jackets 65 and 66, or by other means.

Referring to the hydrating means 4, the function of this portion of the equipment is to incorporate into the soap stream an excess of moisture over and above that desired in the finished soap. It may also serve the function of changing the temperature of the soap, usually by cooling. The form shown in Figure 1 is particularly useful, though other forms, for instance those of Figures 2 and 3, can be substituted.

In the form of hydrating means 4 shown in Figure 1, a container 70 provides a hydrating zone 71. It is desirable to maintain in the lower end thereof a soap mass 72 containing moisture, with an upper surface 73. Submerged discharge of the incoming soap stream is often desirable and the pipe 64 is shown as extending downward a sufficient distance into the soap mass to effect this end and prevent formation of a mere depression in the surface 73. Such submerged discharge facilitates separation of vapors from the soap mass 72, insures a clean separation of soap and vapors and can be used to set up a circulation in this soap mass.

A deflector 74 may desirably be positioned in the soap mass in such position that the incoming soap stream impinges thereagainst and sets up a circulation, such as indicated by arrows 75. This circulation facilitates uniform incorporation of the water and makes vapor separation better.

Also submerged in the soap mass 72 is a plate 76 which divides the soap mass into upper and lower zones communicating through a passage 77 but preventing agitation in the upper zone from being transmitted to the lower zone. The excessively hydrated soap may be removed from the lower zone through pipe 78 assisted, if necessary, by the action of a transport means 79 which may be in the form previously described but which is herein-shown as a pump.

Vapors are desirably removed continuously from the upper end of the hydrating zone 71, though they may be confined therein in certain instances. If vapors are continuously removed, the moisture in the chamber has two paths of escape, either as vapor from the upper end or as moisture in the soap withdrawn. To maintain the soap mass with its desired moisture content, it is then desirable to supply a total amount of water to the hydrating zone 71 which substantially equals the amount withdrawn therefrom as vapor or as incorporated in the soap. If no vapors are removed, the amount of water needed will be that amount necessary to excessively hydrate the soap. In either instance, the required amount of moisture can be supplied to the soap mass through a pipe 80 which may communicate with a desired portion or portions of the soap mass. As shown, it discharges upward beneath the deflector 74 to join the internally-circulating soap mass. If this expedient is used, it is sometimes possible to dispense with the deflector 74, permitting the streams flowing through the pipes 64 and 80 to impinge against each other, thus insuring a very uniform hydration and, at the same time, setting up a circulation in the upper zone of the soap mass.

The pipe 80 may also serve as a part of the circulating system for externally circulating the material in the soap mass through a closed path. For example, a pump 82 may intake from the soap mass through a pipe 83 and discharge into the pipe 80 whereby the material in the soap mass can be continuously circulated. A heat exchange means 84 may be associated with the pipe 80 but can usually be dispensed with. If used, it offers a means of heating or cooling the soap mass 72, as does also a jacket 85 surrounding the container 70. Cooling is more often desirable at this stage than heating, particularly in processing a soap which is fluid due to the presence of heat.

The desired amount of water, hot or cold, preferably the latter, can be proportioned into the circulating material as by being introduced into the pipe 83 through a pipe 86. A suitable valve or properly-controlled pumping means, or both, can be used to introduce the water in proportioned quantities. Likewise, if steam is continuously withdrawn from the hydrating zone 71, as through a pipe 88 including a valve 89, this steam may be condensed in a condenser 90, the condensate dropping through a barometric column 91, if desired, into a receiver 92. This condensate may be re-introduced into the circulating stream by use of pump 93 which discharges into the pipe 83. In addition, builders, fillers, perfumes and the like can be added at this stage in suitably proportioned quantities as through a valved pipe 94 or by incorporation in the receiver 92.

By controlling vaporization in the hydrating zone 71, it is possible to control the amount of water in the outgoing soap and thus accurately control the excessive hydration. At the same time, the soap can be cooled by this expedient. Thus, assuming that no heat is added through the jacket 85 or the heat exchange means 84, the heat available for vaporization of water from the soap mass is represented by the B. t. u. content of the soap stream entering the hydrating zone. The heat units thus available supply the relatively small amount of heat necessary to raise water to the boiling point at the pressure existing in the hydrating zone and the relatively large amount of heat required for the heat of vaporization of the water. Correspondingly, if vaporization is permitted in this hydrating zone and the vapors are continuously removed, much of the heat in the soap is removed with the vapors, with a consequent cooling of the soap.

The amount of vaporization can be controlled through one or more factors, including the temperature and pressure conditions maintained in the hydrating zone, the heat applied to the chamber or circulating system (including the heat of the incoming soap stream), the degree of cooling of the soap mass through introduction of cold water or by cooling through the expedient of the jacket 85 or heat exchange means 84, etc. The pressure in the hydrating zone 71 is controlled mainly by the rate of withdrawal of vapors. If these vapors are forcibly withdrawn, as by a pump 95 connected to the condenser 90, a vacuum may be maintained in the hydrating zone and the vaporization will be increased correspondingly, with consequent increased cooling of the soap and increased demand of incoming water if the degree of excessive hydration is to remain substantially constant. If the withdrawal of vapors is throttled, as by closing the valve 89 and permitting escape of vapors through valve 96 opened to the desired extent, a superatmospheric pressure retarding vaporization may be produced, or intermediate pressures may be used in the hydrating zone 71. However, if the soap mass is at such temperature that exposure to the air would result in deleterious reactions, air should be excluded even from this chamber, as well as from the transport means and the zone 30. Continuous discharge of vapors from the hydrating zone 71, even into the atmosphere through an opening filled with moving vapors, will be sufficient to exclude air once this system is in operation and assuming no vacuum is to be maintained. In any event, the rate of withdrawal of the vapors from the hydrating zone 30 can be used to control the vaporization in this zone and the degree of excessive hydration desired for the subsequent step in which the excess moisture is removed.

The soap may be cooled to a temperature below that temperature at which water will vaporize at the pressure existing in the lower zone of the soap mass 72. The result will be that the moisture in the withdrawn soap is in liquid form and a solution of soap and water will result if a suitable excess of moisture is added. On the other hand, it is possible to operate the invention in such manner that a mixture of soap and steam is withdrawn from the hydrating zone. If such a stream is released into a low pressure chamber, most of the water will separate as steam and substantially anhydrous soap may again be produced in sub-divided condition. But, if such a stream is cooled before being sprayed into a chamber of lower pressure, it is possible to condense a portion of the steam so that the soap delivered to the spray chamber may include some steam and some water. By proper control of the proportions of steam and water, it is possible to produce a soap of desired moisture content. In other instances, such a stream containing some steam and some water may be produced directly from the hydrating zone without the necessity of heating or cooling to control the proportion of vaporized water. In Figure 1, no heating or cooling means is shown in this capacity, though such means can be utilized in conjunction with the soap flowing through the pipe 78.

As to the moisture-removing means 5, its function is primarily to remove from the excessively hydrated soap that amount of moisture over and above that desired in the finished soap. Preferably, it does this by vaporization of the excess moisture. In addition, it may serve the very valuable function of forming the soap into a suitable fabricated sub-divided condition. For example, it can be used to produce the finished soap in the form of solid or hollow particles and can control the bulk of the product.

Various means can be used in this connection. As above-mentioned, the excessively hydrated soap stream can be released into a chamber under such conditions that the excess moisture will vaporize without necessarily applying additional heat. Various other types of spray-drying equipment well known in the art can be used at this stage of the process. The numerous variables which can be controlled in such spray-drying equipment to produce soap of the desired moisture content and bulk are well known and need not be detailed. Suffice it to say that these steps often utilize heated air or gas flowing concurrent or countercurrent to a spray of the incoming soap. In the present invention, the excessively hydrated soap can thus be sprayed. Control of the temperature of this excessively hydrated soap, control of its moisture content and control of the temperature of the air or gas in the spray-drying chamber can well be used to produce a finished soap of the desired moisture content and in the desired form.

As shown in Figure 1, the excessively hydrated soap is continuously sprayed into a chamber 100 provided by a container 101 through one or more nozzles 102. A stream of gas or air is introduced into the upper end of this chamber by a pump or blower 103 and this stream may be heated, if desired, by a heater 104. Concurrent downward flow of the sprayed soap and the heated or unheated gas or air is thus provided for, the products including the soap and gas or air being withdrawn through a conduit 104a and discharged into a separator 105 which may be equipped with a pump or blower 106. The soap collects in the separator 105 and may be suitably withdrawn either continuously or intermittently.

Various other types of spray-drying equipment can be utilized in this conncetion, as well as the forms of moisture-removing means 5 shown diagrammatically in Figures 2 and 3.

Referring to Figure 2, the saponification system shown is substantially the same as indicated in Figure 1, the functions of the various devices being as described with reference thereto.

A somewhat different means 2 is shown in Figure 2, the incoming stream being introduced through one or more nozzles 115 which are preferably disposed to discharge the soap into contact with the wall of the container 29. This expedient facilitates separation of water and glycerine vapors during downward flow along this wall to the soap mass, the upper surface of which is indicated at 46. Glycerine and water vapors can be continuously withdrawn and condensed as described with reference to Figure 1. In general, the function of the means 2 is the same as that previously described with reference to Figure 1.

Similarly, the transport means 3 may serve the functions previously described with reference to Figure 1. However, in addition, a portion of this transport means may serve as the hydrating means 4. For example, the soap may be cooled during movement in the conveyor and water introduced through pipe 120. The amount of water thus introduced may be sufficient to produce the excess hydration desired and this water may serve to cool the soap as well as to effect hydration. For example, if the water is introduced while the soap is at a temperature above the boiling point of water at the pressure existing at the point of introduction, this water may be vaporized in whole or in part. If any of the water vapors are permitted to return to the zone 30, these vapors may be used to facilitate separation of glycerine and water in this zone. On the other hand, such vapors may advance with the soap and be subsequently condensed in part when the soap is cooled preparatory to spraying it into the moisture-removing means 5. On the other hand, if the moisture required for the excessive hydration is in liquid form when moving through pipe 121 into which the conveyor discharges, heat may be added to vaporize a desired portion of the water preparatory to such spraying. To either heat or cool the stream, I have shown a heat exchange means 122 which may be used in addition to or alternatively with the jackets 65 and 66 of the conveyor. The stream is shown as moving through a coil 124 positioned in a container 125 through which a heating or cooling medium is circulated, as by connections 126.

On the other hand, water may be introduced into the advancing soap through a pipe 127 after discharge from the conveyor. The amount thus introduced will be sufficient to produce the excessively hydrated soap desired and, in this instance, the heat exchange means 122 can be used or dispensed with according to the desired conditions of the stream which enters the moisture-removing means 5.

To meter the correct amount of water into the soap through pipes 120 or 127, I have shown a pump 128 discharging water thereinto, as controlled by valves 129 and 130. This pump is shown as being driven by the motor 13 to secure the introduction of an amount of water proportional to the soap produced. In some instances, hydration may be effected by supplying water through the pipes 120 and 127 simultaneously.

The moisture-removing means 5 of Figure 2 may be of the type which requires no circulation of heated air or gas therethrough. For example, it may comprise a container 135 from which vapors are withdrawn through a pipe 136 to a catch-all 137 which separates any soap removed with the vapors. A pump 138 may continuously withdraw the vapors. The incoming stream is introduced into a chamber 139, provided by the container 135, through a nozzle 140 which is preferably disposed in a skirt 141. If the pressure in the chamber 139 is considerably lower than in the pipe 78, the expanding jet may cause separation of the excess water content which is removed in vapor form through the pipe 136, allowing subdivided soap of the desired moisture content to collect in the lower end of the chamber 139 to be removed continuously or periodically by any suitable means, such as a conveyor 142. For example, if the incoming stream contains moisture which is partially in the form of steam and partially in the form of water, this release of the stream into the chamber 139 may vaporize an additional proportion of the water. The amount of water vaporized can be controlled by varying the conditions of temperature and pressure in the chamber 139 and also by controlling the temperature or the proportions of water and steam present in the incoming stream.

If desired, air or other gas may be admitted to the lower end of the chamber 139 through openings 144 or these openings may be closed to exclude air, if desired, in which event a vacuum can be maintained in the chamber 139. If air is admitted through the openings 144, heating thereof is not necessary, though this expedient can be used if desired. In some instances, subatmospheric pressures are desirable in the chamber 139 and these can well be developed by the pump 138. Usually, however, by proper control, it is possible to utilize pressures which are substantially atmospheric or somewhat above. Even a chamber 139, which is open to the atmosphere at its upper end, can sometimes be used.

Referring particularly to Figure 3, the modification therein shown is particularly adapted to the hydration of soap which is fluid due to the application of heat. Any suitable saponification system may be used. If saponification is effected by the means shown in Figure 1, the products may be sprayed downward in the zone 30 of the means 2. Glycerine and water vapors may be separated, if desired, by the expedients previously described, and a body of soap which is fluid due to the presence of heat can be collected in this zone.

The transport means 3 of Figure 3 includes a barometric column 150, preferably jacketed as indicated by the numeral 151, to maintain such temperature during downward movement of the soap therein as will insure this soap being in fluid condition. A pump 152 may be incorporated in this barometric column to increase the pressure in the soap and correspondingly decrease the height of the barometric column 150 which might otherwise be desirable to balance any difference in pressure between the zone 30 and the hydrating zone 71. Such a pump will also serve the function of providing an effective seal for the vacuum in the zone 30, though this function may also be performed exclusively by the barometric column 150, particularly if it discharges beneath the surface of the soap mass 72 as disclosed. If the barometric column is used exclusively for transporting the soap, its height will be dependent upon the pressure difference which exists between the zones 30 and 71. The pressure in the zone 71 will in turn be controlled by factors previously mentioned with reference to Figure 1.

A simplified form of water injection into the hydrating zone 71 is disclosed in Figure 3 as comprising a pipe 155 through which a proper amount of water is introduced to compensate for the steam withdrawn in vapor form through the pipe 88 and to supply the desired excessive hydration of the soap withdrawn through pipe 78.

In Figure 3, the excessively hydrated stream of soap moves through the pump 79 and into an injector 160 where it is picked up by a stream of gas or steam moving through a pipe 161 and a nozzle 162. Such an injector may sometimes be used to the exclusion of the pump 79 and may also be used to incorporate additional moisture into the soap which moves through a pipe 165 to the moisture-removing means 5.

In Figure 3, the moisture-removing means 5 provides a chamber 170 into which the stream of soap and gas or steam is continuously introduced in a downward direction. A stream of air or gas, heated if desired by heater 171, is moved upward in the chamber 170 by a blower 172 and acts to vaporize the excess moisture over and above that amount desired in the finished soap. The moisture is withdrawn in vapor state through pipe 175 and moves to a dust collector 176 which separates any entrained soap. Most of the soap accumulates in the lower end of the chamber 170 in sub-divided form and can be removed continuously or intermittently, as desired.

Various changes and modifications can be made without departing from the spirit of the invention.

I claim as my invention:

1. A method of producing a soap of desired moisture content from soap which is fluid due to the presence of heat and which exists in substantially anhydrous condition in a zone confined from the atmosphere, which method includes the steps of: maintaining a soap mass containing moisture in a hydrating zone from which air is excluded; continuously withdrawing a stream of the substantially anhydrous fluid soap from said first-named zone and discharging same beneath the upper surface of said soap mass in said hydrating zone; withdrawing from said hydrating zone a stream of soap which contains an amount of moisture in excess of that desired in the finished soap; and evaporating said excess moisture after withdrawal from said hydrating zone to produce a finished soap of said desired moisture content.

2. A method of producing a soap of desired moisture content from soap which is fluid due to the presence of heat and which exists in substantially anhydrous condition in a zone confined from the atmosphere, which method includes the steps of: maintaining a soap mass containing moisture in a hydrating zone from which air is excluded; continuously withdrawing a stream of the substantially anhydrous fluid soap from said first-named zone and discharging same beneath the upper surface of said soap mass in said hydrating zone; continuously removing vapors from said hydrating zone; withdrawing from said hydrating zone a stream of soap which contains an amount of moisture in excess of that desired in the finished soap; and evaporating said excess moisture after withdrawal from said hydrating zone to produce a finished soap of said desired moisture content.

3. A method of producing a soap of desired moisture content from soap which is fluid due to the presence of heat and which exists in substantially anhydrous condition in a zone confined from the atmosphere, which method includes the steps of: maintaining a soap mass containing moisture in a hydrating zone from which air is excluded; continuously withdrawing a stream of the substantially anhydrous fluid soap from said first-named zone and discharging same beneath the upper surface of said soap mass in said hydrating zone whereby the heat of said stream of fluid soap vaporizes water from said mass; continuously withdrawing vapor from said hydrating zone; introducing into said hydrating zone an amount of water considerably in excess of that amount necessary to form the steam which is removed in vapor state from said hydrating zone thereby hydrating the soap, the amount of water thus supplied being sufficient to hydrate said soap so that it contains an amount of moisture in excess of that amount desired in the finished soap; and then removing from the excessively hydrated soap that excess of moisture over and above the amount desired in said finished soap.

4. A method of producing a soap of desired moisture content from soap which is fluid due to the presence of heat and which exists in substantially anhydrous condition in a zone confined from the atmosphere, which method includes the steps of: maintaining a soap mass containing moisture in a hydrating zone from which air is excluded; continuously withdrawing a stream of the substantially anhydrous fluid soap from said first-named zone and discharging same beneath the upper surface of said soap mass in said hydrating zone whereby the heat of said stream of fluid soap vaporizes water from said mass; continuously withdrawing vapor from said hydrating zone; introducing into said hydrating zone an amount of water considerably in excess of that amount necessary to form the steam which is removed in vapor state from said hydrating zone thereby hydrating the soap, the amount of water thus supplied being sufficient to hydrate said soap so that it contains an amount of moisture in excess of that amount desired in the finished soap; removing the excessively hydrated soap from said hydrating zone; and vaporizing from the excessively hydrated soap thus withdrawn that excess of moisture over and above the amount desired in said finished soap.

5. A method of producing soap of desired moisture content, which method includes the steps of: forming substantially anhydrous soap; moving a stream of said soap through a space confined from the atmosphere; incorporating moisture into the soap while it is at a temperature above the boiling point of water at the pressure existing in said space confined from the atmosphere thus forming a stream of soap containing an amount of moisture in excess of that desired in the finished soap, at least a portion of said moisture being in the form of steam; releasing this stream of soap into a chamber to separate from the soap that moisture in excess of that desired in the finished soap; and collecting in this chamber the soap from which this excess moisture has been removed.

6. A method as defined in claim 5, including the step of cooling the stream of soap containing the excess moisture before introduction into said chamber.

7. In combination in an apparatus for producing soap of a desired moisture content: walls defining a hydrating zone containing a soap mass; means for discharging a soap stream beneath the upper surface of said soap mass; means for removing vapors from said hydrating zone; means for supplying water to said hydrating zone; means for withdrawing material from said soap mass; and means for vaporizing water from the material thus removed to produce a soap of said desired moisture content.

8. A method of processing substantially anhydrous soap which is fluid due to the presence of heat to produce a soap of desired moisture content, which method includes the steps of: maintaining in a chamber a soap mass containing moisture and an atmosphere of vapor thereabove and in contact therewith; continuously bringing the substantially anhydrous soap while fluid due to the presence of heat into contact with said mass of soap; continuously supplying moisture to said chamber in amount greater than that which is desired in the finished soap; continuously withdrawing soap from said soap mass while containing this excess moisture; and vaporizing the excess moisture from the soap after removal from said chamber.

9. A method of processing substantially anhydrous soap to produce a soap of desired moisture content, which method includes the steps of: maintaining in a chamber a soap mass containing moisture and an atmosphere of vapor thereabove and in contact therewith; continuously bringing the substantially anhydrous soap into contact with said mass; continuously supplying moisture to said chamber in amount greater than that which is desired in the finished soap; continuously withdrawing vapors from said chamber; continuously withdrawing soap from said soap mass while containing an amount of moisture greater than that desired in the finished soap; and vaporizing the excess moisture from the soap after removal from said chamber.

10. A method of processing substantially anhydrous soap which is fluid due to the presence of heat to produce a soap of desired moisture content, which method includes the steps of: maintaining in a chamber a soap mass containing moisture and an atmosphere of vapor thereabove and in contact therewith; continuously bringing the substantially anhydrous soap while fluid due to the presence of heat into contact with said mass of soap; continuously supplying moisture to said chamber in amount greater than that which is desired in the finished soap; continuously removing excess moisture in vapor state from said chamber; and continuously withdrawing soap from said chamber.

11. A method of hydrating substantially anhydrous soap, which method includes the steps of: maintaining in a chamber a soap mass containing moisture; continuously introducing the substantially anhydrous soap into said chamber to combine with said soap mass; withdrawing material from one portion of said soap mass and returning it to another portion thereof to establish a circulation; adding water to the material thus circulated before re-introduction into said soap mass; and withdrawing hydrated soap from said soap mass.

12. A method as defined in claim 11 in which such an amount of water is added to the soap as will produce a hydrated soap containing more moisture than is desired in the finished soap, and in which this excessively hydrated soap is removed continuously from said chamber and sprayed to reduce the moisture content to the desired value.

13. A method of hydrating substantially anhydrous soap, which method includes the steps of: maintaining in a chamber a soap mass containing moisture; continuously introducing the substantially anhydrous soap into said chamber to combine with said soap mass; continuously adding water to said chamber; withdrawing material from one portion of said soap mass and returning it to another portion thereof to establish a circulation; cooling the material thus circulated before re-introduction into said soap mass; and withdrawing hydrated soap from said soap mass.

14. A method of hydrating substantially anhydrous soap, which method includes the steps of: maintaining in a chamber a soap mass containing moisture; continuouly introducing the substantially anhydrous soap into said chamber to combine with said soap mass; continuously adding water to said chamber; withdrawing material from one portion of said soap mass and returning it to another portion thereof to establish a circulation; adding a filling substance to the material thus circulated before re-introduction into said soap mass; and withdrawing hydrated soap from said soap mass.

15. A process for producing soap of desired moisture content, which process includes the steps of: introducing into a chamber streams respectively comprising water and substantially anhydrous soap which is fluid due to the presence of heat, while delivering to said chamber an amount of moisture greater than that desired in the finished soap, the heat of said soap vaporizing a portion of the moisture in said chamber with consequent cooling of the soap; continuously removing from said chamber in vapor state a portion of the excess moisture; removing soap from said chamber while still containing an amount of moisture in excess of that desired in the finished soap, and vaporizing the excess moisture from the soap after removal from said chamber to produce a soap of desired moisture content.

BENJAMIN CLAYTON.